US010320623B2

(12) United States Patent
Kolluru et al.

(10) Patent No.: US 10,320,623 B2
(45) Date of Patent: *Jun. 11, 2019

(54) TECHNIQUES FOR TRACKING RESOURCE USAGE STATISTICS PER TRANSACTION ACROSS MULTIPLE LAYERS OF PROTOCOLS

(71) Applicant: Microsoft Technology Licensing, LLC, Redmond, WA (US)

(72) Inventors: Raghu Kolluru, Woodinville, WA (US); David Nunez Tejerina, Bellevue, WA (US); Siddhartha Mathur, Sammamish, WA (US); James Kleewein, Kirkland, WA (US); Adrian Hamza, Bellevue, WA (US); Ozan Ozhan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/604,184

(22) Filed: May 24, 2017

(65) Prior Publication Data
US 2017/0264505 A1 Sep. 14, 2017

Related U.S. Application Data

(63) Continuation of application No. 13/360,460, filed on Jan. 27, 2012, now Pat. No. 9,686,152.

(51) Int. Cl.
*H04L 12/24* (2006.01)
*H04L 29/08* (2006.01)
*G06F 11/34* (2006.01)

(52) U.S. Cl.
CPC ...... *H04L 41/5035* (2013.01); *G06F 11/3476* (2013.01); *H04L 67/22* (2013.01);
(Continued)

(58) Field of Classification Search
CPC .................................................. H04L 41/5035
See application file for complete search history.

(56) References Cited

U.S. PATENT DOCUMENTS 7,406,694 B2 7/2008 Sen
8,190,807 B2 5/2012 Reid et al.
(Continued)

OTHER PUBLICATIONS

Levi, et al., "Managing Your App's Resource Usage", Retrieved at: <<http://code.google.com/appengine/articles/managing-resources.html>>, Nov. 2011, pp. 5.
(Continued)

*Primary Examiner* — Jimmy H Tran

(57) ABSTRACT

Techniques to track resource usage statistics per transaction across multiple layers of protocols and across multiple threads, processes and/or devices are disclosed. In one embodiment, for example, a technique may comprise assigning an activity context to a request at the beginning of a first stage, where the activity context has an initial set of properties. The values of the properties may be assigned to the properties in the initial set during the first stage. The value of a property may be stored on a data store local to the first stage. The activity context may be transferred to a second stage when the request begins the second stage. The transferred activity context may include a property from the initial set of properties. The stored values may be analyzed to determine a resource usage statistic. Other embodiments are described and claimed.

20 Claims, 8 Drawing Sheets

(52) U.S. Cl.
CPC .... *G06F 11/3419* (2013.01); *G06F 2201/865* (2013.01); *G06F 2201/87* (2013.01)

(56) References Cited

U.S. PATENT DOCUMENTS

| | | | |
|---|---|---|---|
| 8,326,894 B2 | 12/2012 | Qi | |
| 8,438,240 B2 | 5/2013 | Prince et al. | |
| 8,914,684 B2 | 12/2014 | Cota-Robles et al. | |
| 2001/0037399 A1* | 11/2001 | Eylon | G06F 17/30067 709/231 |
| 2002/0063735 A1* | 5/2002 | Tamir | G06F 11/3438 715/745 |
| 2002/0065864 A1 | 5/2002 | Hartsell et al. | |
| 2002/0152305 A1* | 10/2002 | Jackson | H04L 41/5035 709/224 |
| 2003/0115508 A1 | 6/2003 | Ali et al. | |
| 2004/0024859 A1 | 2/2004 | Bloch et al. | |
| 2004/0261081 A1 | 12/2004 | Sen | |
| 2005/0076052 A1* | 4/2005 | Kojima | G06Q 30/06 |
| 2005/0081010 A1 | 4/2005 | DeWitt, Jr. et al. | |
| 2005/0091363 A1 | 4/2005 | McCormick et al. | |
| 2005/0165889 A1 | 7/2005 | Muret et al. | |
| 2005/0193036 A1 | 9/2005 | Phillips et al. | |
| 2005/0203952 A1* | 9/2005 | Deily | G06F 17/30902 |
| 2006/0168569 A1* | 7/2006 | Smith | G06F 11/3672 717/124 |
| 2007/0016893 A1* | 1/2007 | Branda | G06F 11/3447 717/127 |
| 2007/0033273 A1 | 2/2007 | White et al. | |
| 2007/0043531 A1 | 2/2007 | Kosche et al. | |
| 2007/0162595 A1 | 7/2007 | Samprathi | |
| 2009/0150574 A1 | 6/2009 | Kawahara et al. | |
| 2010/0094861 A1 | 4/2010 | Andrade et al. | |
| 2010/0114999 A1 | 5/2010 | Qi | |
| 2010/0306599 A1* | 12/2010 | Cota-Robles | G06F 11/0784 714/48 |
| 2013/0080575 A1 | 3/2013 | Prince et al. | |
| 2013/0198363 A1 | 8/2013 | Kolluru et al. | |
| 2014/0006881 A1* | 1/2014 | Loimuneva | G06F 11/0706 714/57 |

OTHER PUBLICATIONS

Shabajee, et al., "The Capture and Tracking of 'Pieces of Information': Necessary Requirements for 'Educational' and Rich Repurposing Architectures?", Retrieved at: <<http://personal.ilrt.bris.ac.uk/paulshabajee/publications/pieces%20of%20information%20HP%20technical%20report%20HPL2003-36.pdf>>, Mar. 5, 2003, pp. 14.

U.S. Appl. No. 13/360,460, Amendment and Response filed Oct. 21, 2013, 10 pgs.

U.S. Appl. No. 13/360,460, Amendment and Response filed Dec. 10, 2015, 12 pgs.

U.S. Appl. No. 13/360,460, Amendment and Response filed Dec. 8, 2016, 13 pgs.

U.S. Appl. No. 13/360,460, Amendment and Response filed Feb. 19, 2015, 12 pgs.

U.S. Appl. No. 13/360,460, Amendment and Response filed Jun. 27, 2014, 14 pgs.

U.S. Appl. No. 13/360,460, Amendment and Response filed Aug. 2, 2016, 19 pgs.

U.S. Appl. No. 13/360,460, Amendment and Response filed Aug. 24, 2015, 11 pgs.

U.S. Appl. No. 13/360,460, Notice of Allowance dated Feb. 16, 2017, 9 pgs.

U.S. Appl. No. 13/360,460, Office Action dated Nov. 19, 2014, 25 pgs.

U.S. Appl. No. 13/360,460, Office Action dated Feb. 27, 2014, 17 pgs.

U.S. Appl. No. 13/360,460, Office Action dated Mar. 2, 2016, 19 pgs.

U.S. Appl. No. 13/360,460, Office Action dated May 13, 2015, 17 pgs.

U.S. Appl. No. 13/360,460, Office Action dated Jul. 19, 2013, 17 pgs.

U.S. Appl. No. 13/360,460, Office Action dated Sep. 10, 2015, 18 pgs.

U.S. Appl. No. 13/360,460, Office Action dated Sep. 8, 2016, 22 pgs.

* cited by examiner

TECHNIQUES FOR TRACKING RESOURCE USAGE STATISTICS PER TRANSACTION ACROSS MULTIPLE LAYERS OF PROTOCOLS

CROSS-REFERENCE TO RELATED APPLICATIONS

This application is a continuation application of U.S. patent application Ser. No. 13/360,460 (now U.S. Pat. No. 9,686,152), entitled "TECHNIQUES FOR TRACKING RESOURCE USAGE STATISTICS PER TRANSACTION ACROSS MULTIPLE LAYERS OF PROTOCOLS," filed on Jan. 27, 2012, the entire disclosure of which is hereby incorporated herein by reference.

BACKGROUND

A web service may employ many different protocols to respond to requests for its services. Each protocol may have its own resource usage characteristics. Usage of the different services and related protocols may also vary, for example, according to time of day. Having different services and different protocols can make determining an overall pattern of usage challenging. Having such an awareness of overall usage pattern, however, could improve resource allocation and throttling algorithms that could improve user experience with the web service. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to track resource usage statistics per transaction across multiple layers of protocols. Some embodiments are particularly directed to techniques to track resource usage statistics per transaction across multiple layers of protocols and across multiple threads, processes and/or devices. In one embodiment, for example, a technique may comprise assigning an activity context to a request at the beginning of a first stage, where the activity context has an initial set of properties. The values of the properties may be assigned to the properties in the initial set during the first stage. The value of a property may be stored on a data store local to the first stage. The activity context may be transferred to a second stage when the request begins the second stage. The transferred activity context may include a property from the initial set of properties. The stored values may be analyzed to determine a resource usage statistic. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Conventionally, web services servers have been able to determine resource usage statistics for individual protocols, or within one process, for example. Further, data about usage was typically static, and only provided by a process on a build. However, many service requests may be handled by more than one process, thread, protocol and/or device. Tracking the total resource usage of one request has not been conventionally possible.

Various embodiments are directed to techniques to track resource usage statistics per transaction across multiple layers of protocols and across multiple threads, processes and/or devices. For example, in an embodiment, an activity context may be assigned to a request. The activity context may include various properties that may describe the request, such as client information, user information, the requested action, and so forth. The activity context may travel with the request as the request is handled, even from one thread to another, one process to another, and/or one device to another. The values of activity context properties may be stored in log files locally along the processing path, for example, before a transition to another thread, process or device. An activity context may have a default set of standard properties. In an embodiment, a default set of standard properties may include, for example, an activity duration, a read count, a write count, a read latency, a write latency and other performance metrics. Additional properties may be added to the activity context at different stages as the request is processed, for example, a user agent that identifies a browser being used on the requesting client device and cookies that may have been included in a request. The information stored in the log files may be analyzed and used for various reasons, such as to adjust throttling, debug software, and providing performance and data usage metrics. As a result, the embodiments can improve web services server performance.

Figure 1:
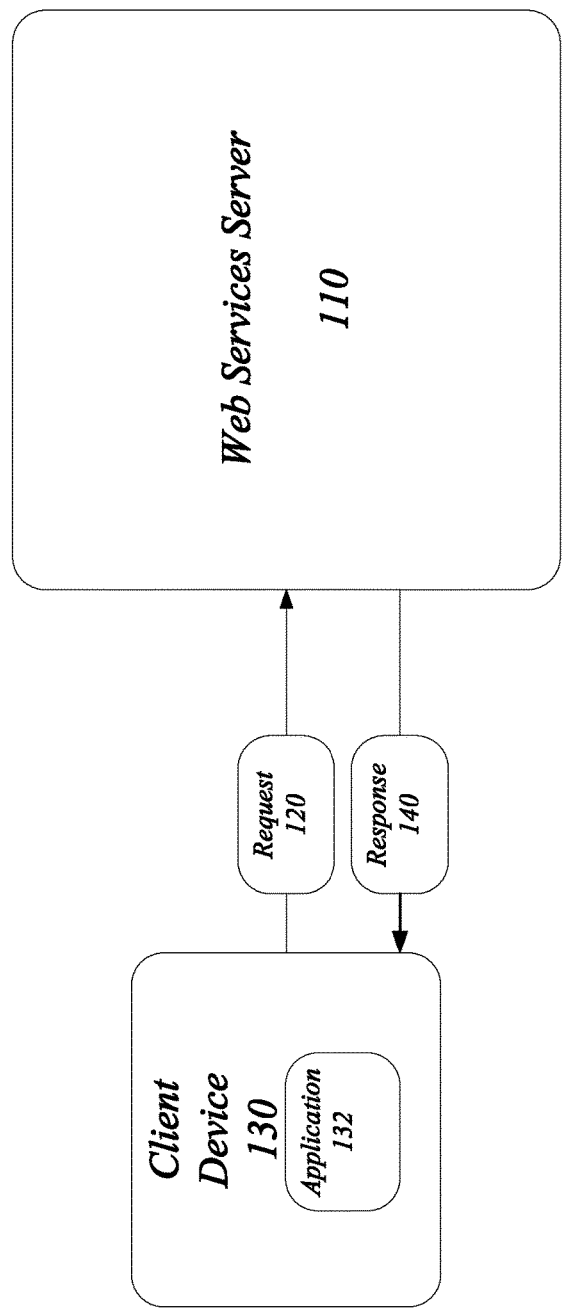
FIG. 1 illustrates an embodiment of a first system for providing web services.

FIG. 1 illustrates a block diagram for a system 100 for providing web services. In one embodiment, for example, the system 100 may comprise a computer-implemented system 100 having multiple components, such as a web services server 110 and a client device 130. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented with one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a super-computer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

In various embodiments, the system 100 may comprise a web services server 110. Web services server 110, also referred to herein as WSS 110, may be one or more server devices that receive requests for data and/or services from client devices, such as client device 130. One example of a WSS 110 is EXCHANGE SERVER® from MICROSOFT CORP. of Redmond, Wash., USA. The embodiments are not limited to this example.

WSS 110 may generally provide services such as email services, contact management services, calendar services, document sharing services, presence information services, services through a web interface, and so forth. An example of WSS 110 is described further with respect to FIG. 2.

WSS 110 may receive a request 120 from a client device 130. Request 120 may be a request for data, a request for a service, a request for both data and a service, and so forth. For example, request 120 may be a request to get unread messages from an email inbox. Request 120 may be a request to send an email message composed on client device 130. WSS 110 may process request 120 and provide a response 140 to client device 130.

In an embodiment, WSS 110 may be implemented with a cloud computing model. In a cloud computing model, applications and services may be provided as though the applications and data were on a local device, without having to install the applications and/or store the data on a local device. However, the applications and/or data storage may be implemented across many devices, servers, and data stores, accessible over a communication interface from a local device. In a cloud computing model, WSS 110 may be physically embodied on one or more servers, and in one or more physical locations. WSS 110 may be a sub-component of a larger cloud computing implementation of a group of services. Regardless of physical configuration, WSS 110 may appear, logically, as one device or system to external entities, such as client device 130.

In various embodiments, the system 100 may comprise client device 130. Client device 130 may include any electronic devices capable of sending requests to and receiving responses 140 from WSS 110. Client device 130 may include one or more applications 132 that may communicate with WSS 110 to receive or send data, and perform various functions. Such an application may include an e-mail client application, a calendar application, a contact management application, a word processing application, a web browser, and so forth.

Figure 2:
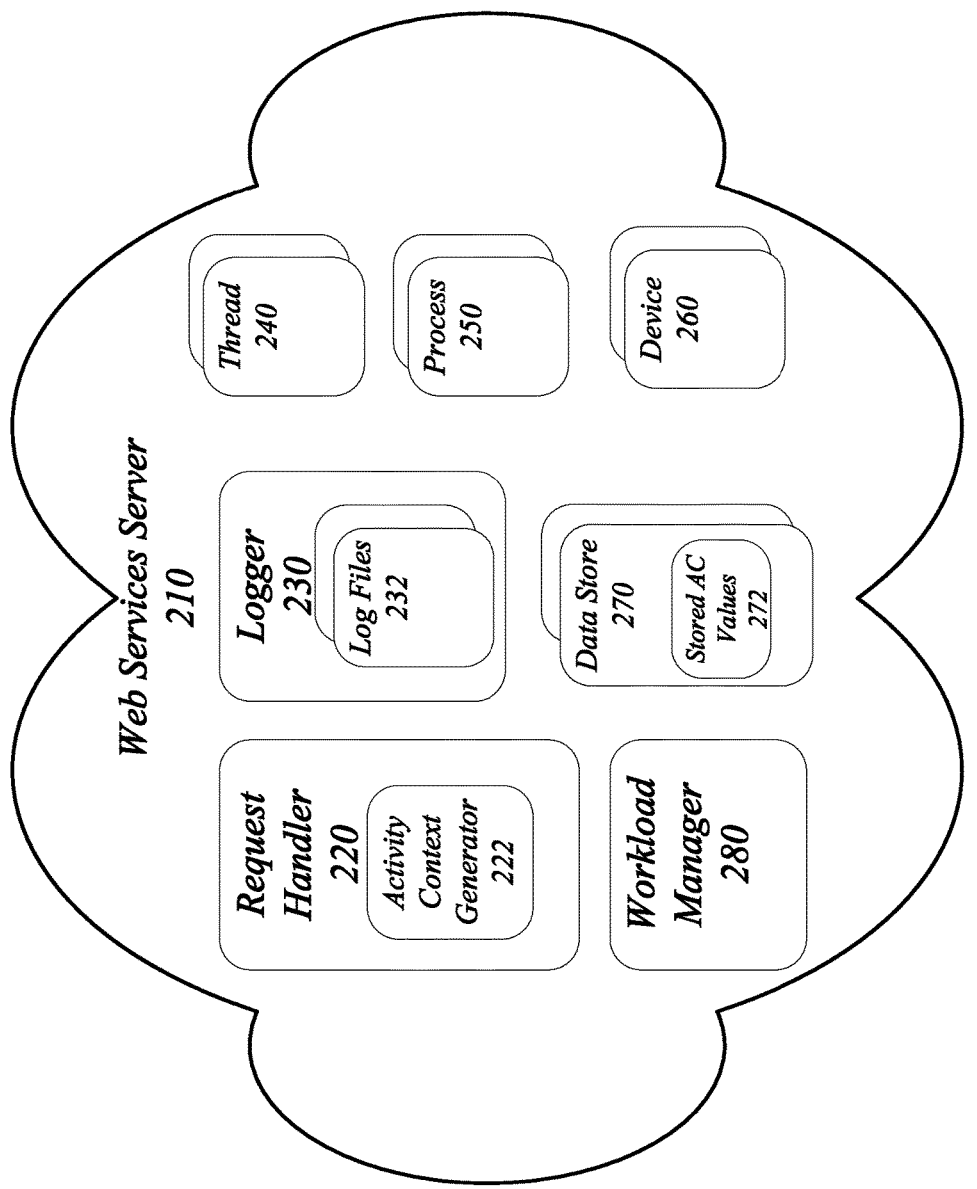
FIG. 2 illustrates an embodiment of a web services server to track resource usage statistics per transaction across multiple layers of protocols.

FIG. 2 illustrates a block diagram of a web services server 210 to track resource usage statistics per transaction across multiple layers of protocols. Web services server 210 (also referred to herein as WSS 210) may be a representative embodiment of WSS 110. WSS 210 may appear as one logical entity while being implemented with a plurality of devices, data stores and applications. WSS 210 may include one or more components, such as a request handler 220, a logger 230, and a workload manager 280. WSS 210 may further include a data store 270. WSS 210 may be implemented with more or other components and is not limited to this example.

In various embodiments, WSS 210 may include request handler 220. Request handler 220 may receive incoming requests, such as request 120. Request handler 220 may determine what components of WSS 210 may be needed to handle the request. Prior to handing the request to a process, thread, or device, request handler 220 may create an activity context 222 and assign it to the request.

Activity context 222 may be a data structure that includes one or more properties about the request. Activity context 222 may start with an initial set of properties. A property may be analogous to a variable. Activity context 222 may be, for example, a list of property names and their respective values. Other data structures, such as an array or a class object may also be used.

Properties may be added to or removed from activity context 222 during the course of processing the request. Some properties may have values specific to the request. Other properties may have values that reflect a resource usage metric. Examples of properties include, without limitation, an activity identifier; a user identifier; an email address; an authentication type; an authentication token; a tenant identifier; a tenant type; a component; a component instance; a feature; a protocol of the request; client information; an action; metadata; a client version; resource usage metrics such as: a number of processing unit cycles; a number of read operations; a number of write operations; a number of database accesses; a number of times a protocol is used; a number of requests from an application; memory usage; a number of requests from a client; a number of requests from a user; a latency time; a total activity time; a peak request time; and so forth.

Activity context 222 may stay with the request throughout the stages of processing of the request. The values of the properties in activity context 222 may be determined and set during the processing of the request. An example of an activity context is described further with respect to FIG. 3.

In various embodiments, WSS 210 may include logger 230. Logger 230 may store some or all of the contents of activity context 222 to a data store that is local to where the request is currently being processed, e.g. in data store 270. In particular, logger 230 may store contents of activity context 222 as stored activity context (AC) values 272 when the request is passed from one stage to another in processing. A stage may include a thread 240, a process 250, or a device 260. A request may be passed from one thread to another thread, from one device to another device, from one process to another process, or any combination of these, during processing.

Logger 230 may also collect stored activity context values 272 and generate a log file 232 on a periodic basis. The log file 232 may aggregate and/or analyze data from stored activity context values 272 from multiple requests. Logger 230 may, for example, determine how many requests came from a particular application or client device, which hour during the day had the most requests, the average time to handle a request and so forth. Log files 232 may be used to adjust throttling algorithms, to debug a problematic stage, or to provide other performance related data, such as peak usage times and response times, for administrative purposes.

As previously mentioned, a request may be processed in one or more stages, e.g. thread 240, process 250, and device 260. A request may be processed by one or more threads, one or more processes, one or more devices, or any combination of these. For example, a request may be processed by a plurality of threads on one device, but not by any processes. Another request may be processed by a process on one device and another process on another device, but not by any threads. The embodiments are not limited to these examples.

Thread 240 may be a processing unit thread that is invoked to handle the request or a portion of request handling. Thread 240 may only exist during execution and may generally not persist beyond its execution. During processing, a request may be passed from one thread to another thread, a process, and/or a device.

Process 250 may be an executable unit of software instructions, such as a function, sub-routine, script, class method and so forth. While the instructions for process 250 may persist on a computer-readable medium, the process 250 that executes on the request may not persist beyond its execution. During processing, a request may be passed from one process to another process, a thread, and/or a device.

Device 260 may be a physical unit, such as an electronic device, a volatile or non-volatile memory, a processing unit and so forth. A device 260 may also include a server. A request may be passed from one device 260 to another device 260 during processing. Unlike thread 240 and process 250, device 260 persists in physical form even when not processing a request.

In various embodiments, WSS 210 may include workload manager 280. Workload manager 280 may read log files 232 and analyze the data therein. Workload manager 280 may identify abnormal request activity, e.g. an unusually high number of requests from a particular source, requests that take too long to process, and so forth. Workload 280 may throttle incoming requests from the particular source, for example, while leaving requests from other sources unaffected in order to preserve service levels. Workload manager 280 may also, for example, generate an alert for web services server 210 administrators when other performance metrics indicate a problem within WSS 210.

The components of WSS 210, such as request handler 220, logger 230, and workload manger 280, may be communicatively coupled via various types of communications media. The components 220, 230, and 280 may coordinate operations between each other. The coordination may involve the uni-directional or bi-directional exchange of information. For instance, the components 220, 230, and 280 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Figure 3:
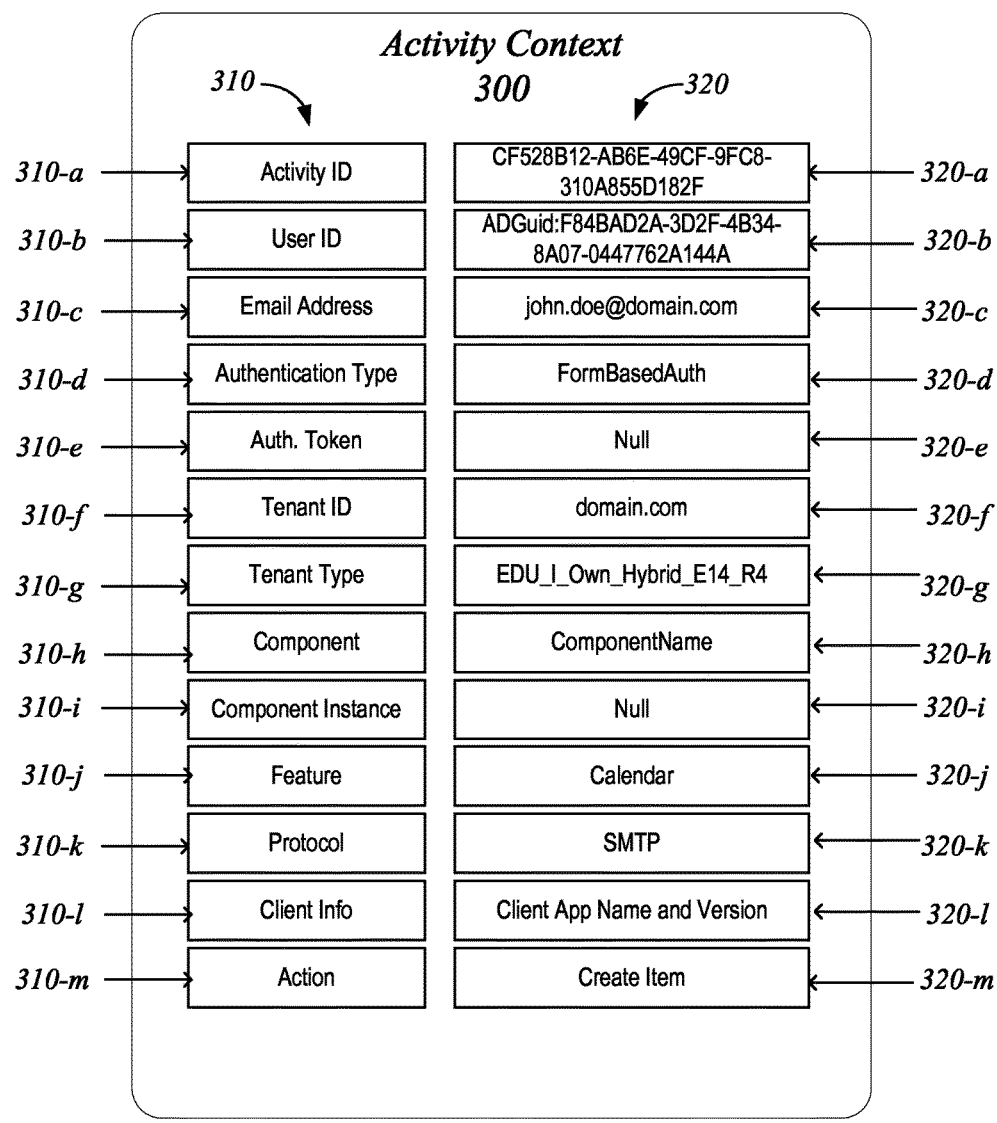
FIG. 3 illustrates an embodiment of an activity context.

FIG. 3 illustrates a block diagram of an activity context 300. Activity context 300 may be a representative embodiment of activity context 222. Activity context 300 shows a set of properties 310 and the values 320 of the properties. Some or all of properties 310 may also be referred to as metadata. An activity context 300 may include more, fewer, or other properties than those shown.

Activity ID property 310-$a$ may have a value 320-$a$ that represents a unique identifier for the request that activity context 300 is associated with.

User ID property 310-$b$ may have a value 320-$b$ that represents a unique identifier for the user that is accessing WSS 110, 210. In some cases, user ID property 310-$b$ may have a user's email address as value 320-$b$, a login name, or an account name.

Email address property 310-$c$ may have a value 320-$c$ that represents the e-mail address of the accessing user.

Authentication type property 310-$d$ may have a value 320-$d$ that represents a type of authentication that was used to authenticate the user's email address.

Authentication token property 310-$e$ may have a value 320-$e$ that represents a sub-type of authentication, when applicable. In the current example, the authentication type "FormBaseAuth" does not have a sub-type.

Tenant ID property 310-$f$ may have a value 320-$f$ that represents the domain name of the tenant that is receiving web services from WSS 110, 210, e.g. a business entity or government entity.

Tenant type property 310-$g$ may have a value 320-$g$ that represents the type of tenant.

Component property 310-$h$ may have a value 320-$h$ that represents the first component in WSS 110, 210 that handles the request. If WSS 110, 210 is an EXCHANGE SERVER®, for example, the components may be OUTLOOK WEB SERVICE®, EXCHANGE WEB SERVICE®, or an assistant component.

Component instance property 310-$i$ may have a value 320-$i$ that identifies an instance of a component, when there is more than one instance of a component to handle a request.

Feature property 310-$j$ may have a value 320-$j$ that represents a feature within WSS 110, 210 that is relevant to the request.

Protocol property 310-$k$ may have a value 320-$k$ that indicates the protocol of the request. Examples of protocols may include without limitation hypertext protocol (HTTP), simple mail transfer protocol (SMTP), post office protocol (POP), Internet message access protocol (IMAP), and EXCHANGE WEB SERVICE® (EWS).

Client information property 310-$l$ may have a value 320-$l$ that indicates the client application 132 and version number that sent the request.

Action property 310-$m$ may have a value 320-$m$ that identifies the requested action. Examples of actions may include without limitation, create item, get item, decline item, forward item, send read receipt and so forth.

Activity context 300 may have workload related properties added during the processing of its associated request. Some workload related properties may include, for example, a number of calls to a database, a directory, or mailbox; the time to complete a read or write operation; latency on a read or write, how long an activity took to complete, and/or memory usage.

In an embodiment, activity context 300 may be an abstraction of a .NET CallContext class object. Activity context 300 may be an abstraction of, for example, of .NET's HttpContext or .NET's Operation Context. Activity context 300 may use a CallContext class to carry the properties' values across stages.

Figure 4:
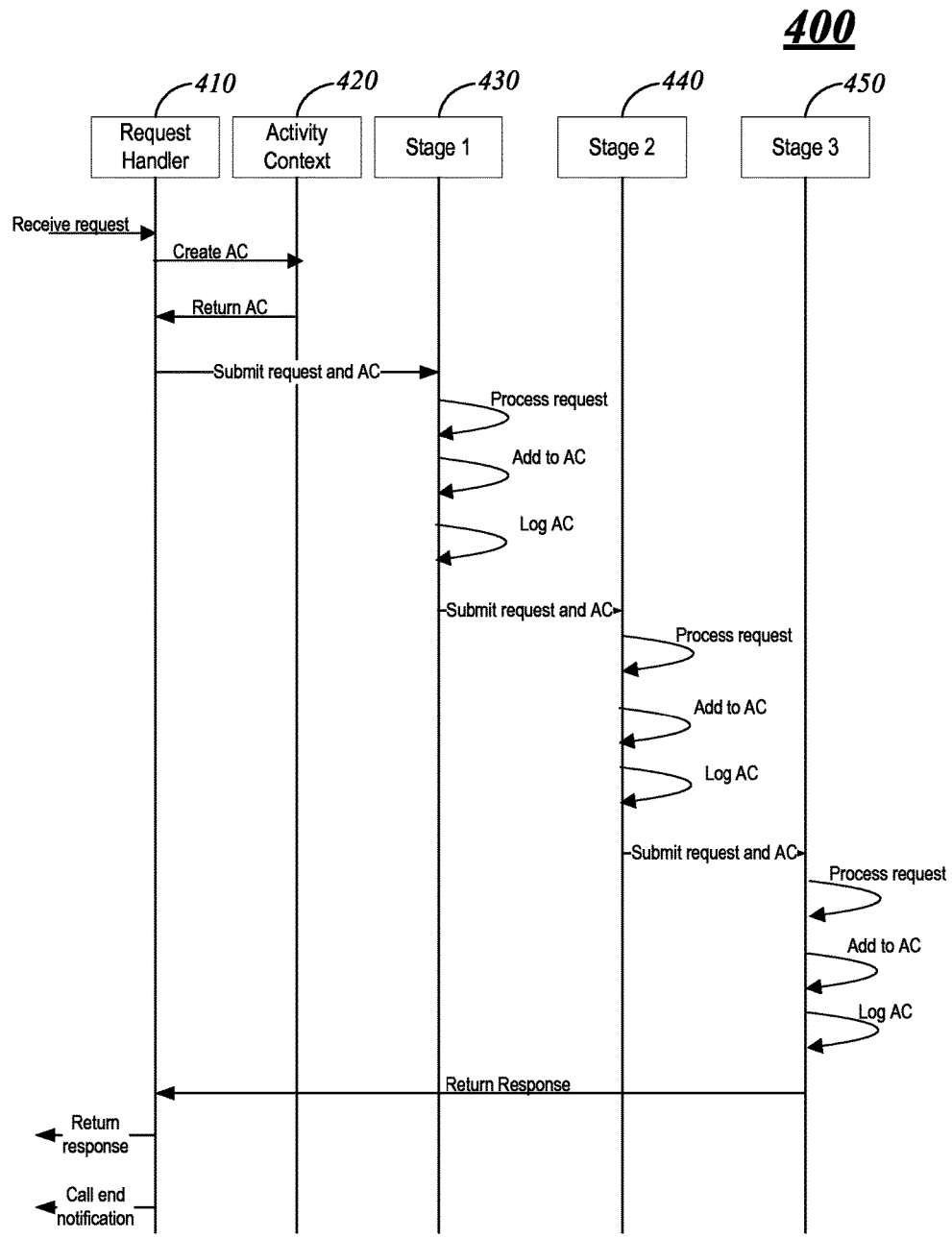
FIG. 4 illustrates a sequence diagram of tracking resource usage statistics per transaction across multiple layers of protocols.

FIG. 4 illustrates a sequence diagram 400 of tracking resource usage statistics per transaction across multiple layers of protocols according to various embodiments. A sequence diagram represents a sequence of actions that takes place among a set of actors over time. Time begins at the top of the diagram and advances toward the bottom. The actors in sequence diagram 400 include a request handler 410, an activity context 420, a stage 430 ("stage 1"), a stage 440 ("stage 2"), and a stage 450 ("stage 3"). Request handler 410 may be a representative example of request handler 220. Activity context 420 may be a representative example of activity context 222. Stages 1, 2, and 3 may be representative embodiments of any of thread 240, process 250, and/or device 260.

Sequence diagram 400 begins when request handler 410 receives a request, e.g. request 120. Request handler 410 creates activity context 420, for example, by creating a new activity context class object. In an embodiment, request handler 410 may pass the request to an activity context creator so that the created activity context may set the values of some initial set of properties based on the request, e.g. a user ID, email address, action, and so forth. Activity context 420 may be returned to request handler 410 as a result of being created. In an embodiment, properties of activity context 420 may have their values assigned by request handler 410 once activity context 420 is returned to request handler 410.

Request handler 410 may submit the request and activity context 420 to stage 430. Stage 430 may process the request according to its instructions. Stage 430 may add properties to activity context 420 and assign a value to each added property. When stage 430 is finished with its portion of processing, it may log some or all of the contents of activity context 420. In an embodiment, stage 430 may invoke logger 230 (not shown) to perform the logging function. Stage 430 may pass the request and activity context 420 to stage 440. In an embodiment, stage 430 may pass a subset of the properties to stage 440 instead of the entire activity context. The subset may be referenced by the activity ID that identifies the associated request.

Stage 440 may proceed similarly to stage 440 by processing the request, adding properties to activity context 420 and logging some or all of the contents of activity context 420. Stage 440 may pass the request and some or all of activity context 420 to stage 450.

Stage 450 may proceed similarly to stages 430 and 440. In the illustrated example, stage 450 is the last stage of request processing. More or fewer stages may be used to process a request. Stage 450 may then return the results of request processing to request handler 410 after logging some or all of the contents of activity context 420.

Request handler 410 may receive the response. Activity context 420 may be ended, e.g. by freeing the memory used to store the class object. Request handler 410 may return the response to the requesting client, e.g. client device 130. Request handler 410 may also call an end notification function to signal logger 230 that the logging for a request's processing is complete.

Figure 5:
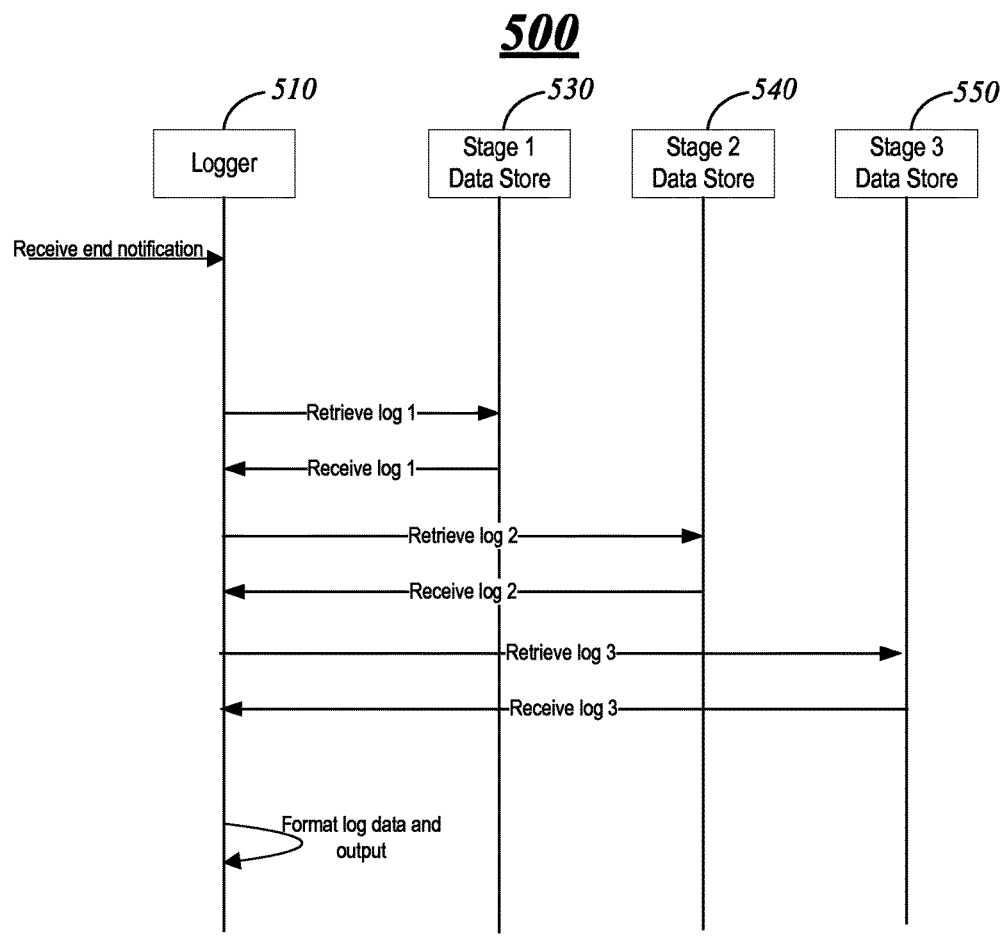
FIG. 5 illustrates an embodiment of a sequence diagram of using the stored values to determine a resource usage pattern.

FIG. 5 illustrates an embodiment of a sequence diagram 500 of using the stored values to determine a resource usage statistic. In sequence diagram 500, the actors are logger 510, stage 1 data store 530, stage 2 data store 540, and stage 3 data store 550. Logger 510 may be a representative embodiment of logger 230. Data stores 530, 540 and 550 may be representative embodiments of data store 270 that correspond, respectively, to where stages 1, 2, and 3 from FIG. 4 stored the contents of activity context 420.

As illustrated, stage data stores 530, 540 and 550 are depicted as separate storage entities. However, different stages may share a data store, for example, when two or more stages are in read/write communication with the same computer-readable storage medium. When different stages share a data store, the contents of an activity context may be stored in one logical file or in separate logical files corresponding to the separate stages.

Sequence diagram 500 may begin when logger 510 receives an end notification call from a request handler, e.g. from request handler 410 from FIG. 4. Logger 510 may begin retrieving stored activity context contents, referred to n FIG. 5 as "log 1", "log 2", and "log 3" immediately, or at a specified interval, e.g. hourly or daily.

Logger 510 may then, at some time, retrieve and receive log 1 from stage 1 data store 530, log 2 from stage 2 data store 540, and log 3 from stage 3 data store 550. Although depicted as sequential in time, logger 510 may retrieve logs substantially simultaneously from the different data stores.

Logger 510 may then format the data from all of the retrieved logs and output a log file 232. In an embodiment, formatting the data may include aggregating and/or analyzing the data from the different logs.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 6:
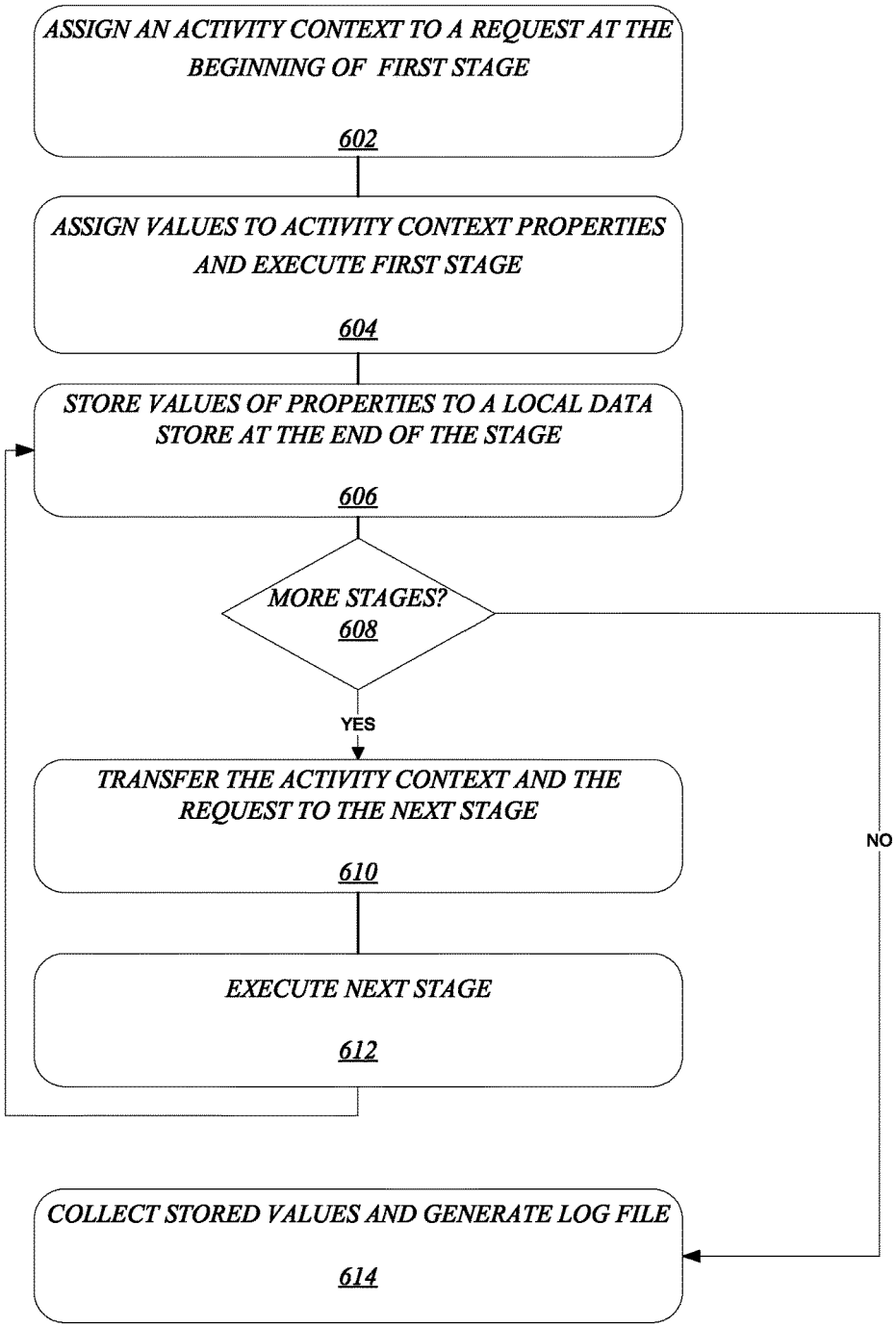
FIG. 6 illustrates an embodiment of a logic flow to track resource usage statistics per transaction across multiple layers of protocols.

FIG. 6 illustrates one embodiment of a logic flow 600. The logic flow 600 may be representative of some or all of the operations executed by one or more embodiments described herein. Logic flow 600 may represent a process of tracking usage statistics per transaction across multiple layers of protocols.

In an embodiment, logic flow 600 may assign an activity context to a request at block 602. For example, request handler 220 may receive request 120 and create an activity context 222. Activity context 222 may be assigned to request 120 and identified by a unique activity identifier.

In an embodiment, logic flow 600 may assign values to activity context properties and execute the first stage in block 604. For example, the act of creating activity context 222 may automatically populate some or all of the values in the initial set of properties. In an embodiment, the values of the initial set of properties may be set after the activity context 222 is created. In an embodiment, some or all of the initial set of properties may be related to the client device 130 and application 132 that sent the request.

In an embodiment, executing a stage may include executing software instructions to perform part of the process of responding to a request. The stage may include executing instructions within a thread and/or a process, for example.

In an embodiment, logic flow 600 may store values of the activity context properties to a local data store at the end of the stage in block 606. For example, after the first stage has executed, some or all of the contents of the activity in its current state may be stored on a computer readable medium that is local to the stage. A local computer readable storage medium may include, for example, a computer readable storage medium with which a stage has direct read/write communication. In some embodiments, only values for activity context properties that are relevant to that stage may be stored.

In an embodiment, when there are more stages needed to complete processing the request, at block 608, logic flow 600 may continue to block 610. When there are no more stages, logic flow 600 may continue at block 614.

In an embodiment, logic flow 600 may transfer the activity context and the request to a next stage in block 610. For example, request 120 may be transferred to a new thread, a new process, and/or a different device. Activity context 222 may be transferred with request 120, either in whole or in part. Some properties and values that were relevant only to the previous stage, for example, may not be passed to the next stage.

In an embodiment, logic flow 600 may execute the next stage in block 612. For example, logic flow 600 may execute additional software instructions relevant to responding to the request in a thread and/or process on the same or a different device from the previous stage.

In an embodiment, at the end of block 612, logic flow 600 may repeat block 606 and determine, again, whether there are additional stages to complete.

In an embodiment, when there are no additional stages to complete, logic flow 600 may collect the stored values generated in block 606 and generate a log file in block 614. For example, logger 230 may retrieve all stored values from their respective local data stores. Logger 230 may use the activity IDs of various activity contexts 222 to assemble all of the values stored about the resource usage of the request from start to finish. Logger 230 may, essentially, create a picture of resource usage for any given request, e.g. the time spent overall or within a particular stage, what data sources were read, what protocols used, and so forth. Logger 230 may aggregate data over multiple requests to generate resource usage statistics, for example, to identify a number of processing unit cycles; a number of read operations; a number of write operations; a number of database accesses; a number of times a protocol is used; a number of requests from an application; a number of requests from a client; a number of requests from a user; a latency time; a total activity time; a peak request time; a relative resource usage of a first client-initiated action and a second client-initiated action; and so forth.

Logger 230 may generate a single log file 232 from the collected data. The log file 232 may include data for only one request, for all requests since the last creation of a log file, or for all requests over a time interval.

The log file may then be used for a variety of purposes, such as but not limited to, modifying throttling algorithms, debugging WSS 110, 210 code, or administrative decisions about resource deployment.

To illustrate the usefulness of various embodiments, suppose a new version of a mobile client application ("newApp") is released for a particular mobile device ("xPhone"), and that newApp sends requests to the web services server. In this example, there is a problem in newApp that causes it to send an abnormally high number of requests to the web services server. The web services server may be able to handle the surge up to a point, after which the abnormally high number causes service degradation for all clients of the web services server.

In an embodiment, each request is assigned an activity context, which may include information about the client application, version and device, among other information. When service degrades, the log files generated from processing requests can be analyzed. On analysis, the workload manager may determine that an abnormally high number of requests are coming from newApp and xPhone. The workload manager may then throttle requests just from the combination of newApp on xPhone. For example, requests from newApp on xPhone may be handled only when the web services server has available resources. Other users will then experience a return to normal service levels, while users of newApp on xPhone may experience reduced service levels until the bug is reported and resolved.

Figure 7:
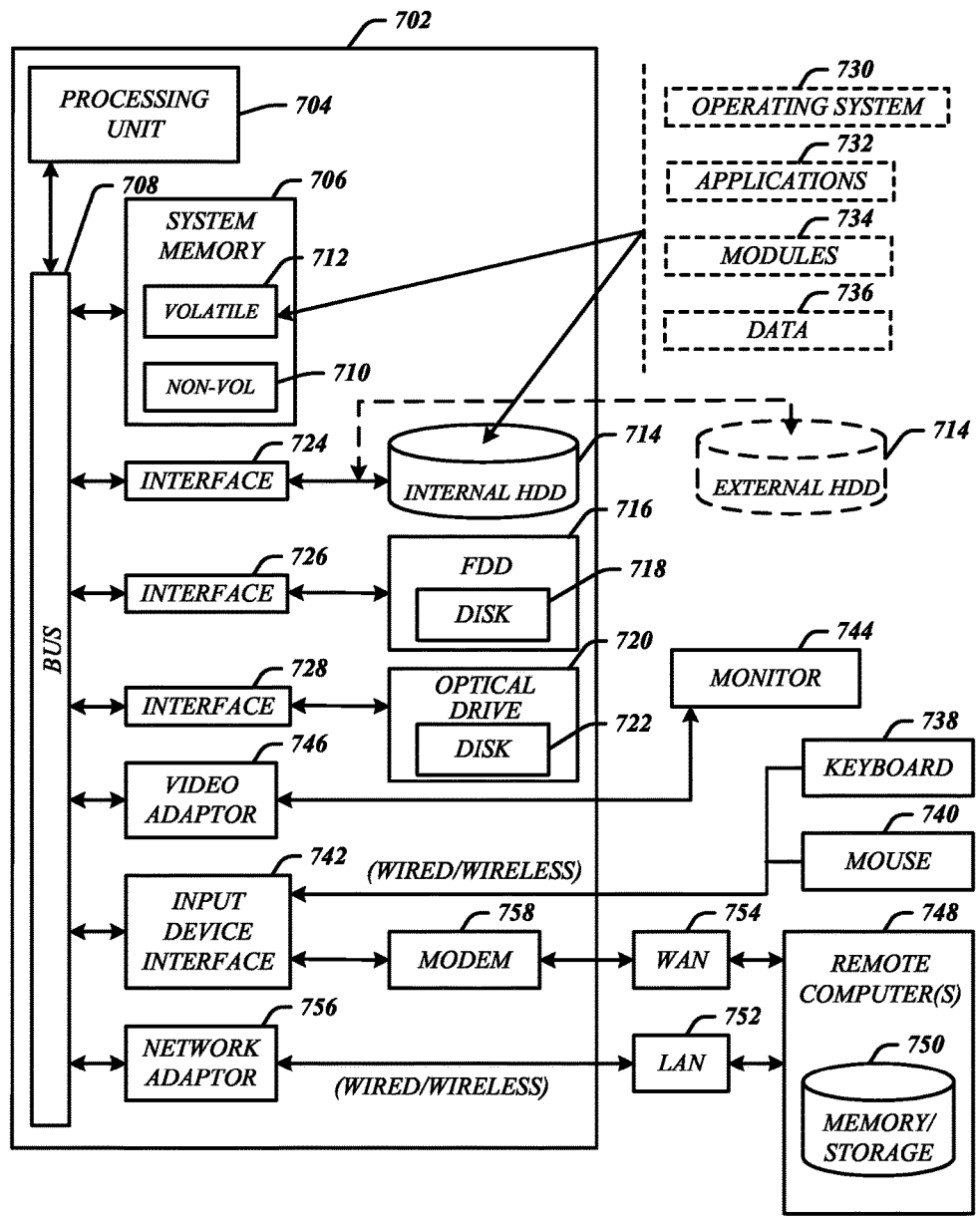
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable storage media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, grammar builder 118, 218, 300, name processing modules 310, name normalizer 320 and speech recognizer 116, 216.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
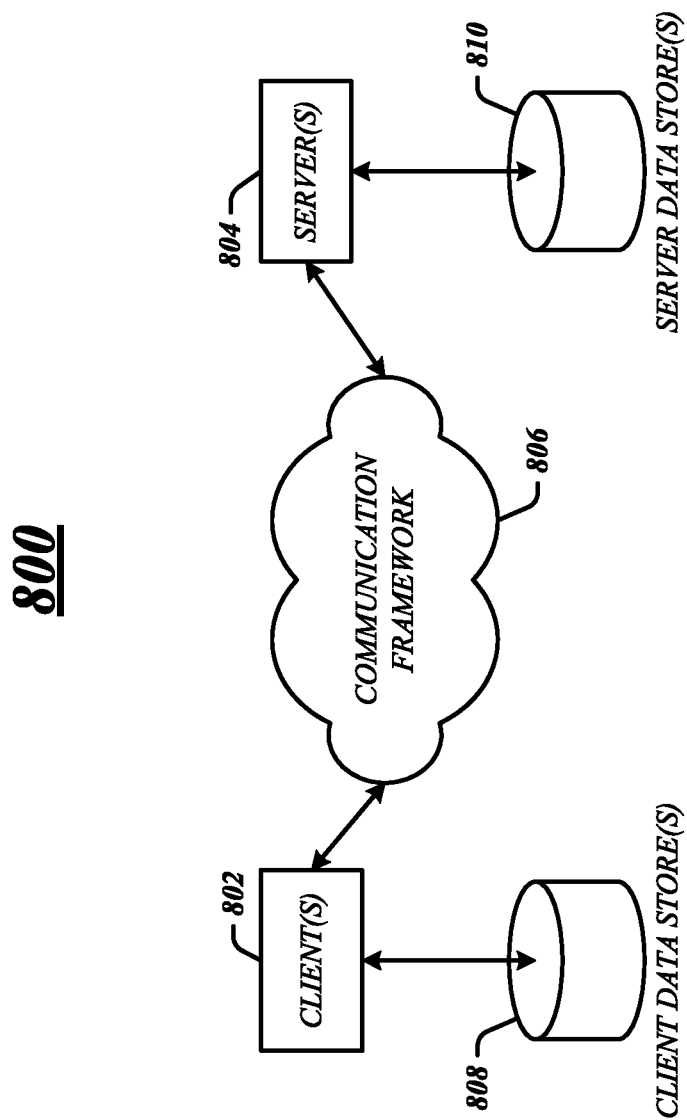
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client device 130. The servers 804 may implement the server systems for web services server 110, 210. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
   receiving a request for at least one of data or services;
   processing the request across a plurality of stages, beginning with a first stage;
   in the first stage, assigning an activity context to the request, wherein the activity context includes an initial set of properties that describe the request, wherein the initial set of properties includes:
   an activity identifier that identifies the request;
   a tenant identifier that identifies a domain name of a tenant receiving services; and
   a component identifier that identifies a component that handles the request;
   in the first stage, assigning values to the initial set of properties;
   transferring the activity context for the request to a second stage of the plurality of stages;
   generating a log file of the assigned values for the initial set of properties;
   analyzing the log file to determine a resource usage statistic; and
   using the resource usage statistic to perform an action.

2. The method of claim 1, wherein a stage comprises at least one of a thread or a process.

3. The method of claim 1, wherein the action comprises at least one of:
   adjust a throttling algorithm;

determine a peak usage time;
determine a response time;
determine a relative resource usage of a first client-initiated action and a second client-initiated action; or
debug a resource performance problem.

4. The method of claim 1, further comprising:
storing the assigned values for the initial set of properties on a data store local to the first stage.

5. The method of claim 1, further comprising:
transferring a subset of the initial set of properties to the second stage, the subset of properties comprising fewer properties than the initial set of properties.

6. The method of claim 5, further comprising:
assigning values to the subset of properties in the second stage; and
storing the assigned values for the subset of properties on a data store local to the second stage.

7. The method of claim 1, wherein the initial set of properties includes a unique identifier of a user.

8. The method of claim 1, wherein a property comprises at least one of:
the activity identifier;
a user identifier;
an email address;
an authentication type;
an authentication token;
the tenant identifier;
a tenant type;
a component;
a component instance;
a feature;
a protocol of the request;
client information;
the action identifier;
a resource usage metric;
metadata; or
a client version.

9. A computing system, comprising:
at least one processing unit; and
at least one memory storing computer-executable instructions that when executed by the at least one processing unit cause the computing system to:
receive a request for at least one of data or services;
process the request across a plurality of stages, beginning with a first stage;
assign an activity context to the request in the first stage, wherein the activity context includes an initial set of properties that describe the request, wherein the initial set of properties includes:
an activity identifier that identifies the request;
a tenant identifier that identifies a domain name of a tenant receiving services; and
a component identifier that identifies a component that handles the request;
assign values to the initial set of properties in the first stage;
transfer the activity context for the request to a second stage of the plurality of stages;
generate a log file of the assigned values for the initial set of properties;
analyze the log file to determine a resource usage statistic; and
use the resource usage statistic to perform an action.

10. The computing system of claim 9, wherein a stage comprises at least one of a thread or a process.

11. The computing system of claim 9, wherein the action comprises at least one of:
adjust a throttling algorithm;
determine a peak usage time;
determine a response time;
determine a relative resource usage of a first client-initiated action and a second client-initiated action; or
debug a resource performance problem.

12. The computing system of claim 9, the computer-executable instructions further causing the computing system to:
store the assigned values for the initial set of properties on a data store local to the first stage.

13. The computing system of claim 9, the computer-executable instructions further causing the computing system to:
transfer a subset of the initial set of properties to the second stage, the subset of properties comprising fewer properties than the initial set of properties.

14. The computing system of claim 13, the computer-executable instructions further causing the computing system to:
assign values to the subset of properties in the second stage; and
store the assigned values for the subset of properties on a data store local to the second stage.

15. The computing system of claim 9, wherein the initial set of properties includes a unique identifier of a user.

16. A computer storage device storing computer-executable instructions that when executed by at least one processing unit cause a computer system to:
receive a request for at least one of data or services;
process the request across a plurality of stages, beginning with a first stage;
assign an activity context to the request in the first stage, wherein the activity context includes an initial set of properties that describe the request, wherein the initial set of properties includes:
an activity identifier that identifies the request;
a tenant identifier that identifies a domain name of a tenant receiving services; and
a component identifier that identifies a component that handles the request;
assign values to the initial set of properties in the first stage;
transfer the activity context for the request to a second stage of the plurality of stages;
generate a log file of the assigned values for the initial set of properties;
analyze the log file to determine a resource usage statistic; and
use the resource usage statistic to perform an action.

17. The computer storage device of claim 16, wherein a stage comprises at least one of a thread or a process.

18. The computer storage device of claim 16, wherein the action comprises at least one of:
adjust a throttling algorithm;
determine a peak usage time;
determine a response time;
determine a relative resource usage of a first client-initiated action and a second client-initiated action; or
debug a resource performance problem.

19. The computer storage device of claim 16, the computer-executable instructions further causing the computer system to:
transfer a subset of the initial set of properties to the second stage, the subset of properties comprising fewer properties than the initial set of properties.

20. The computer storage device of claim 19, the computer-executable instructions further causing the computing system to:

assign values to the subset of properties in the second stage.

* * * * *